B. WOLHAUPTER.
PROCESS FOR MAKING RAIL JOINT BARS.
APPLICATION FILED MAR. 5, 1913.

1,128,645.

Patented Feb. 16, 1915.
7 SHEETS—SHEET 1.

WITNESSES

INVENTOR
Benjamin Wolhaupter

B. WOLHAUPTER.
PROCESS FOR MAKING RAIL JOINT BARS.
APPLICATION FILED MAR. 5, 1913.

1,128,645.

Patented Feb. 16, 1915.

B. WOLHAUPTER.
PROCESS FOR MAKING RAIL JOINT BARS.
APPLICATION FILED MAR. 5, 1913.

1,128,645.

Patented Feb. 16, 1915.
7 SHEETS—SHEET 5.

B. WOLHAUPTER.
PROCESS FOR MAKING RAIL JOINT BARS.
APPLICATION FILED MAR. 5, 1913.

1,128,645.

Patented Feb. 16, 1915.
7 SHEETS—SHEET 6.

Inventor
Benjamin Wolhaupter.

Witnesses

B. WOLHAUPTER.
PROCESS FOR MAKING RAIL JOINT BARS.
APPLICATION FILED MAR. 5, 1913.

1,128,645.

Patented Feb. 16, 1915
7 SHEETS—SHEET 7.

ed non-folded lower member occupying substantially the same plane throughout and lying outside of the plane of its final rail-seating position. And, by reason of the simple angle formation of this angle bar splice section, after its delivery from the roll passes, it may then be readily and cleanly sheared, by shearing knives, into rail joint lengths, whereupon by subsequent steps, the said non-folded lower member has developed therefrom a continuous base section disposed in a final position to constitute a rail seat and support, and horizontal outwardly disposed wide spiking flanges for the tie. In these particulars, the present process is vitally different from, and possesses practical advantages over, any other process known to this applicant, and particularly any other process for making rail joint bars like or similar to the design of bar produced by the present process.

UNITED STATES PATENT OFFICE.

BENJAMIN WOLHAUPTER, OF NEW ROCHELLE, NEW YORK, ASSIGNOR TO THE RAIL JOINT COMPANY, OF NEW YORK, N. Y., A CORPORATION OF NEW YORK.

PROCESS FOR MAKING RAIL-JOINT BARS.

1,128,645.  Specification of Letters Patent.  Patented Feb. 16, 1915.

Application filed March 5, 1913.  Serial No. 752,195.

*To all whom it may concern:*

Be it known that I, BENJAMIN WOLHAUPTER, a citizen of the United States, residing at New Rochelle, in the county of Westchester and State of New York, have invented certain new and useful Improvements in Processes for Making Rail-Joint Bars, of which the following is a specification.

This invention relates to an improved process of manufacturing rail joint bars of the continuous type, that is, of the type having a main angle bar splice member fitting the fishing spaces, and a base section formed integral with said splice member and constituting a rail seat and support.

The main object of the invention is to provide a simple and practical method of manufacturing these joint bars from simple angle bars which can be rolled in an ordinary angle or splice bar mill, and subsequently developed into final form rapidly, accurately, and economically, and only requiring the use of simple mechanical appliances and expedients which are readily available, and can be easily adapted, for the purpose, in connection with a suitable appliance or machine for performing the novel folding step.

A special object of the invention is to provide a process for the development, from a simple angle bar, of a special form of rail joint bar of the continuous type, said process involving an economical use of material and the production of a bar which is more or less flexible toward its ends, and also possesses other practical characteristics of the present continuous type of rail joint bar made according to present processes.

Among the more distinguishing characteristics of the present invention by which it differs so greatly from the known processes, are first the feature of subjecting a billet or bar blank to a roll pass to produce a simple angle bar splice section, having the conventional angles of a simple angle bar, but including a greatly widened foot flange. That is to say, according to the initial step of the improved process, there is first produced in an ordinary angle or splice bar mill, an angle bar splice section having what may be termed a laterally and widely ex- While various instrumentalities may be utilized in carrying out this invention, and various alterations made in the precise manner of handling the bar during the course of its development without departing from the invention, one of the ways in which the process may be carried out in a practical manner is suggested in the accompanying drawings, in which—

7 and 8 are similar views of the bar after being slitted by a true slitting operation, as by knives in a press of suitable construction. Fig. 15 is a diagrammatic view, schematically showing the different steps of the process which may be carried out by a continuous arrangement of instrumentalities from the rolling mill to the stacking pile for the completed bars.

In the description of the various steps of the process, like reference characters will designate corresponding parts in the several figures of the drawings.

Figure 1:
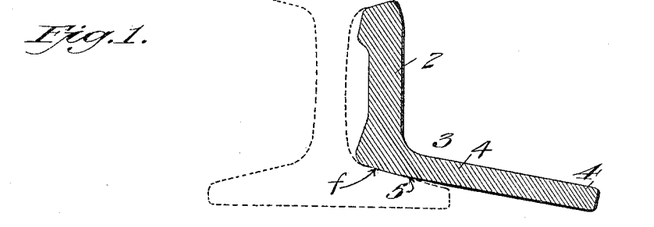
Figure 1 is a cross sectional view of an angle bar splice section as produced by the rolling step of the process, the view illustrating by dotted lines the relation of this section to a rail, and showing the finished characteristic of that portion of the section which fits the fishing space of the rail.
Figure 2:
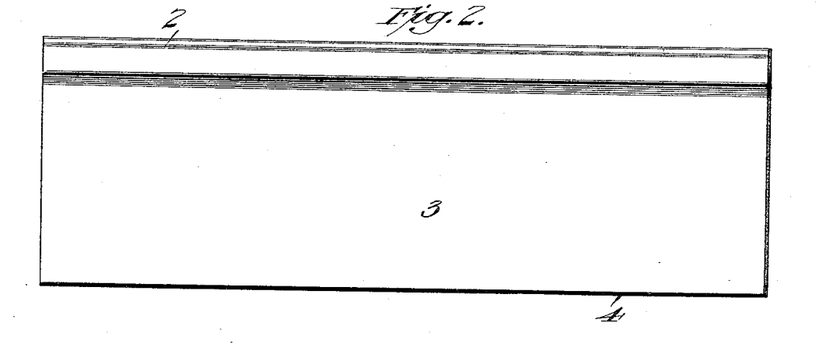
Figs. 2 and 3 are plan and perspective views, respectively, of the said rolled angle bar splice section of Fig. 1.
Figure 3:
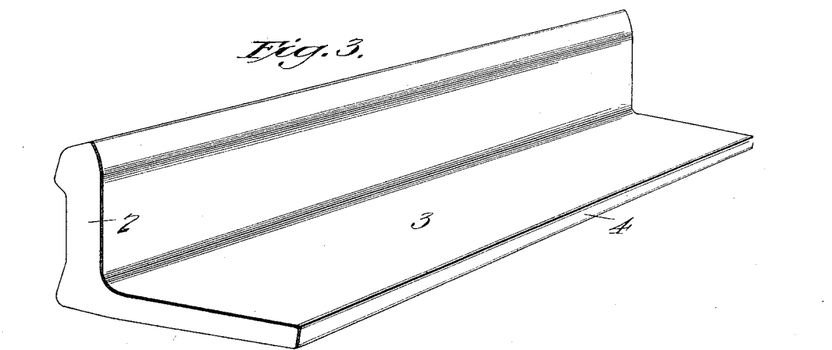

In carrying forward the present invention, the first and fundamental step is the production of a simple angle bar splice section in an ordinary angle or splice bar mill, the final rolls of which mill may be conventionally designated by the reference numeral 1 in Fig. 15 of the drawings. This angle bar splice section as it is delivered from the final pass of the rolls is shown in Figs. 1, 2 and 3 of the drawings and includes a main splice member 2 of finished form adapted to fit the finishing space of the rail as indicated in Fig. 1, and also includes what may be termed a lower member 3 which at this stage of the process is disposed in a position at an angle of more than one hundred and fifty degrees from its required final position. In other words, the angle bar splice section as it comes from the rolling mill is provided with a laterally and widely extended non-folded lower member that occupies substantially the same plane throughout and lies above the horizontal plane of its final rail-seating position. Furthermore, in this form of the bar, the outer portion 4—4 of the said lower member 3 is provided with parallel faces, and it is also preferable to so roll the member 3 that the under side thereof, from a point near its junction with the main splice member 2 is disposed at a different angle from that of the upper side of the flange of the rail. This is clearly shown by the reference numeral 5 on Fig. 1 of the drawings which indicates the point where the under side of the member 3 of the angle bar section leaves the upper surface of the base flange of the rail to which the bar is applied. This formation provides a clearance between the splice bar and the upper outer portion of the rail flange for the purpose of contributing to the flexibility of the joint and making the same so that it will readily adjust and adapt itself to and upon the rail flange. A further object of this different angle is to allow for inequalities in the folding of the base member 3, but it is to be understood that the disposing of the lower member 3 at a different angle from the upper side of the flange of the rail and hence at a different angle from the fishing surface of the fishing or splice member 2 is not essential to this process, as in fact it may be disposed at the same angle as that of the upper side of the flange of the rail.

It will be understood that the bars are rolled in long lengths in the angle bar rolls 1 and as the rolled bar is delivered from the rolls, it is passed over rollers or equivalent guiding means 6, as indicated in the diagram, to a suitable shearing mechanism 7 of any approved or conventional construction and having shear knives for cutting the bar to suitable lengths according to the requirement of the railroad for which the joints are required. Then this shearing step may be succeeded by punching and slotting operations for respectively providing the joint bar with bolt and spike holes, but if found desirable, this punching and slotting may obviously be left for future operations without affecting the fundamental features of this process. However, for the purpose of illustrating the continuity of process that may be observed in carrying out the present invention, there is shown in Fig. 15 of the drawings the arrangement of a suitable punching machine 8 beyond the shearing mechanism 7 and a suitable slotting machine 9 beyond the machine 8, with intervening guiding or conveying means 10 and 11 between these separate instrumentalities.

Figures 5, 6:
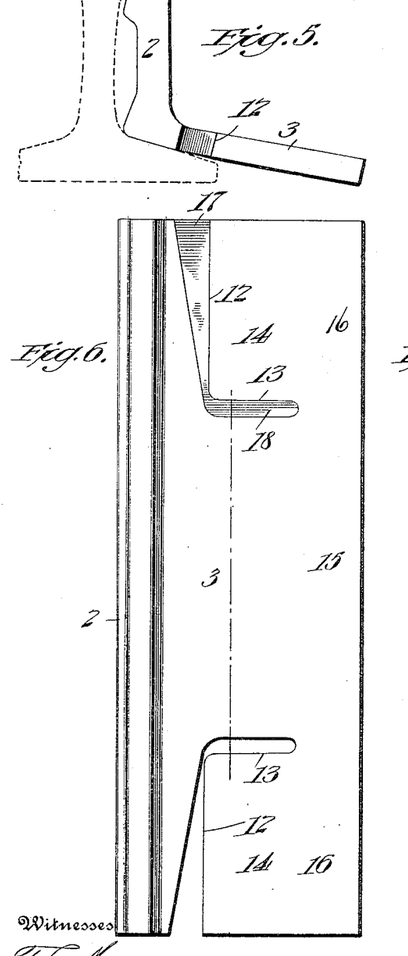
Figs. 5 and 6 are respectively cross sectional and plan views of the joint bar (while still of angle bar formation) after being slitted by means of a punching operation in a press. Figs.
Figures 7, 8:
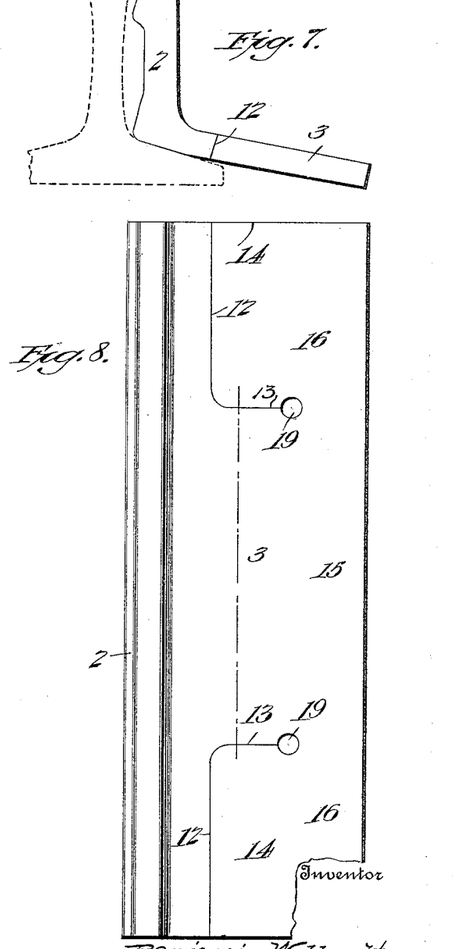

The next step in the process is to subject the angle bar splice section shown in Figs. 1, 2 and 3 to a slitting operation that forms slits in the end portions of the lower member 3, said slits extending inwardly from the ends of the bar in the direction of its length, and terminating in transverse outwardly disposed portions as may be plainly seen in Figs. 6 and 8 of the drawings. Referring particularly to these figures of the drawings, it will be observed that the longitudinally disposed portion of the inwardly extending slits, in the end portions of the lower flange member 3 of the bar, are designated by the reference number 12, while the transverse outwardly disposed portions of the slits are designated by the reference numeral 13, the latter being in communication with the longitudinal portions 12 of the slits, hence being continuations thereof, but at a different angle in order to define and provide at the end portions of the bars the flat flange elements 14 which are usually of rectangular form and which ultimately contribute the spiking flanges of the finished rail joint bar.

While the end slitting 12—13 of the lower member 3 of the angle bar splice section gives definition to the flat flange elements 14, at the same time between the plane of the outer terminals of the transverse portions 13 of the end slits and the outer edge of the said lower member 3 of the angle bar, there is left unaltered, and undisturbed at this point in the process, a base-forming section extending the full length of the angle bar section. This includes a main central portion 15 and end portions 16 continuing from said central portion and ultimately constituting, when in final folded position, the base section of the joint bar which engages beneath the rails to form a rail seat and support.

Figure 4:
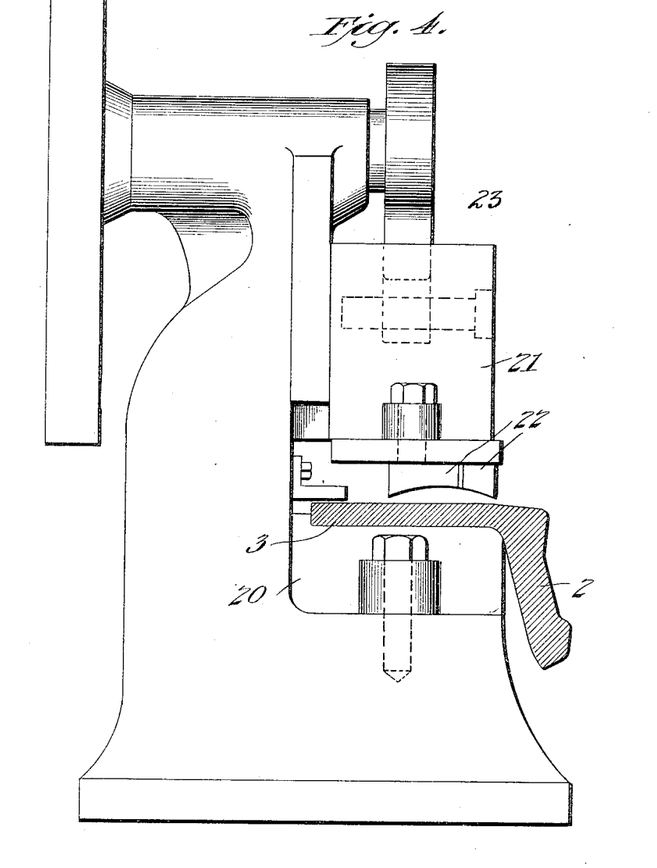
Fig. 4 illustrates the angle bar splice section, (after the shearing operation of dividing the rolled bar into rail joint lengths), in the act of being subjected to manipulation in a press for slitting the end portions of the wide flange of the bar, which flange has been termed the non-folded lower member.

The exact method of producing the end slits in the angle bar splice section is nonessential, but for illustrative purposes there are suggested in Figs. 6 and 8 of the drawings two ways in which this may be effected. For instance there is suggested in Fig. 6 of the drawings, the expedient of forming the end slits 12—13 by a punching operation wherein pieces of metal, such as 17 and 18, are punched out of the bar section in the shape shown at one end of Fig. 6 of the drawings or in equivalent shape. The effect of this operation to produce the end slits is to leave the material undistorted or unbent so that when the base-forming section 15—16 is folded, and thereby turns the spiking flange element 14 outward and downward, these parts of the finished joint bar will take a better bearing under the base of the rail and on the top surface of the tie respectively. Also, instead of the punch-out operation for slitting, the latter may be effected by a true slitting operation, as by knives in a press of suitable construction. The plain cut slit is shown in Fig. 8 of the drawings, but when this method is pursued, it is preferable and desirable that relief holes 19 be punched in the bar at the inner ends of the slits, that is at the terminals of the transverse portions 13 of the slits. The provision of this detail allows the free pulling apart of the metal at the ends of the slits and prevents the slits from working farther into the metal and producing fractures, although it will be understood that the slitting operation can be carried out without the punching of the relief holes. Accordingly, it will be obvious that various instrumentalities may be resorted to for slitting the end portions of the lower flange member 3 of the angle bar splice section, but for the purpose of illustrating this step in the process there is shown in Fig. 4 of the drawings a form of press that may be used. This press though of any suitable construction and operated in any suitable manner mainly includes in its organization, the die or anvil block 20, on which the lower flange member 3 of the angle bar section is laid as shown, and a vertically reciprocating head 21 carrying at its under side the slotting or slitting knives 22 having an arrangement corresponding to the angular character of the end slits 12—13 and adapted to be forced through the bar section to leave it in the form shown in Fig. 6 or in the form shown in Fig. 8, as will be readily understood.

The preferable location of the slitting press is indicated in the diagram of Fig. 15 wherein the same is generally designated by the reference number 23, and by means of a suitable guide or conveyer 24, the joint bars are directed from the slotting machine 9 for the spike holes, while the slitted bars are delivered from the machine 23 to a suitable guide or conveyer 25 from which the bars are preferably carried by the feeding device or mechanism 26 through a heating furnace 27. This furnace serves to reheat the bars sufficiently to facilitate and ease the next step in the process, namely the final step of folding portions of the lower member of the angle bar to final rail-seating and spiking positions respectively.

The location of the folding machine is designated by the reference number 28 on diagrammatic view 15 of the drawings, and a suitable guide or conveyer 29 carries the reheated bars from the furnace 27 to the said machine, and after the latter has performed its operations on the bar, the same is removed over a guide or conveyer 30 to a suitably located storage stack or pile 31, thus completing a continuity of operations which may be carried on to provide for the rapid, accurate, and economical production of the special design of continuous joint bar.

Figure 9:
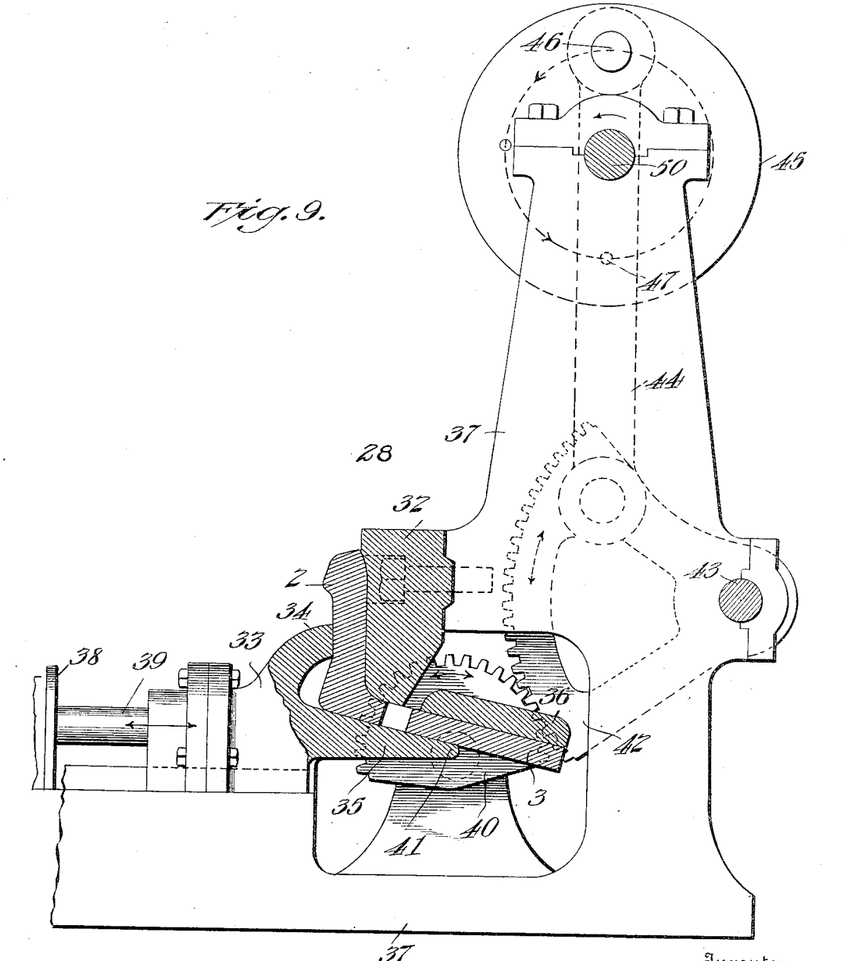
Fig. 9 shows the step of the process wherein the slitted joint bar, of angle bar formation, is adapted to a press of suitable construction, and having instrumentalities which provide for folding the lower portion of the angle bar to bring the base member and the spiking flanges to final positions, said Fig. 9 illustrating the position of parts before the folding step has commenced.
Figure 10:
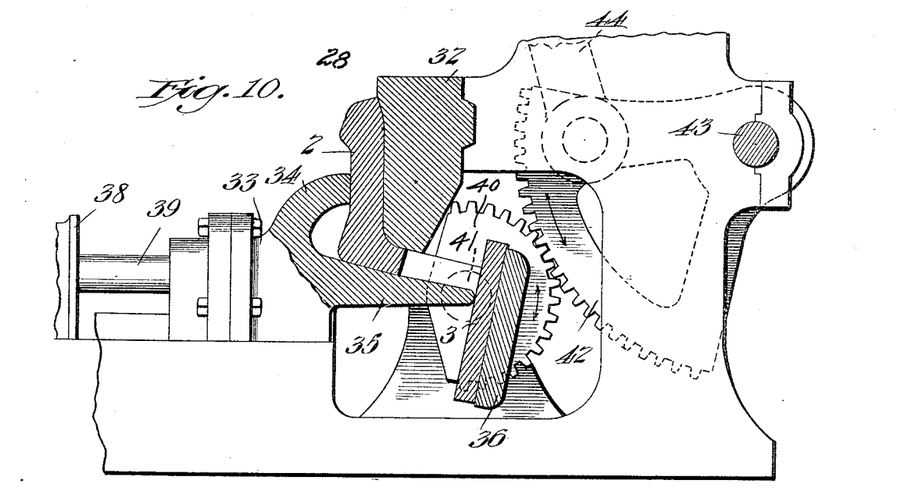
Fig. 10 is a view of the folding mechanism illustrating the said lower member of the angle bar in the position which it occupies after having completed one-half of its folding movement.
Figure 11:
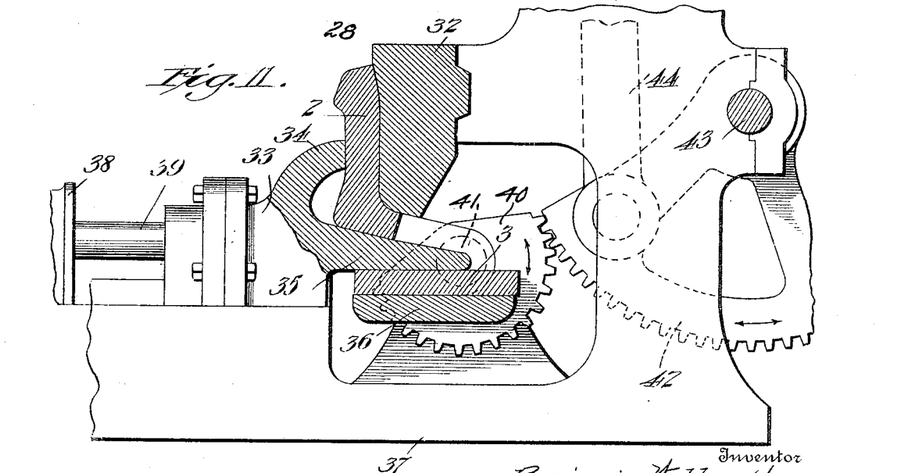
Fig. 11 is a view similar to Fig. 10 illustrating the completion of the folding movement.

Referring particularly to the final step of the process, which may be performed in the folding machine 28, as shown, it will of course be understood that any device, mechanism, or instrumentalities capable of, and adapted to, the peculiar folding action required for bringing the base section of the bar to rail-seating position, and the spike flange element to tie-bearing and spiking positions, may be utilized. In this connection, it will already have been observed that the slitted angle bar splice section, of Fig. 6 or Fig. 8, must be subjected to a folding operation that will fold or bend the non-folded lower member thereof to such an extent that the base-forming section 15—16 of said member is carried through a circular path of more than one hundred and fifty degrees before it reaches its final rail-seating position, and which folding or bending operation will at the same time turn the spiking flange elements 14 outward and downward to a final position where they are adapted to bear on the top surface of the tie and to receive the spikes. Accordingly, there is shown in Figs. 9, 10 and 11 of the drawings, portions of a specially designed folding machine that may be advantageously employed for carrying out the folding step of the process in a practical manner. This machine principally involves a stationary die block 32 adapted to fit the outer side of the main splice member 2 of the angle bar splice section, a movable clamp 33 having an upstanding clamping arm 34 for clamping engagement against the inner side of the main splice member 2, and also having a tapered former-die 35 underlying the angle bar splice section, and a folding leaf 36 adapted to bear on top of the lower member 3 of the angle bar section and to carry it to final position.

The stationary die block 32 of the folding machine is shown removably applied to the machine stand or frame 37, while the movable clamp 33 is illustrated as being power-controlled, such for instance as by a fluid pressure mechanism including a piston working in a cylinder 38 and having a piston stem connection 39 with the clamp. As indicated the latter not only is constructed and arranged so as to firmly and rigidly clamp the angle bar splice section against the stationary die block 32, but is also provided with the tapering former 35 whose rounded nose projects to a position beneath the lower member 3 of the angle bar sections where the line of fold is located, and which is designated by the dot and dash lines in Figs. 6 and 8 of the drawings. The said folding-leaf is the active member of the folding mechanism. It is adapted to flatly engage on top of the portions of the bar section to be folded, and has a movement in a circular path of substantially one hundred and fifty degrees in order to be capable of folding the base-forming section 15—16 around the nose of the former 35 and into the horizontal plane of its final rail-seating position. As shown in the drawings, the said folding-leaf 36 is rigidly connected at its ends with oscillating gears 40 turning on centers 41, the said leaf 36 being necessarily disposed at one side of or eccentric to the said centers. Motion is imparted to the leaf-carrying gears 40 by means of segment gears 42 having a suitably arranged supporting axle 43, and these segment gears 42 are in turn connected by connecting rods 44 with revolving crank disks 45 which are adapted to be controlled by means of a clutch or equivalent mechanical means for controlling the movements thereof to provide for starting, stopping, and returning the folding-leaf 36 to secure the necessary operations thereof in the handling of the angle bar splice section to bring the rail-supporting base section and the spiking flanges to their final positions.

Referring more particularly to the details of the folding step while the bar is clamped in the folding machine 28, it is to be observed that when the crank disk 45 is thrown into operation it revolves until the wrist pin 46 completes one-half of its revolution and reaches the point indicated by the number 47 on Fig. 9 of the drawings, at which time the crank disk is thrown out of operation. This one-half revolution of the crank disk carries the segment gear 42 to the bottom of its travel, and through it, the oscillating gear 40 is revolved through nearly one-half of a revolution, with the result of folding the rail supporting base section and the spiking flanges to their final working positions as above explained. The different positions of the parts of the folding mechanism and of the portions of the angle bar splice section being folded are shown respectively in Figs. 9, 10 and 11 of the drawings. Fig. 9 shows the parts in starting position, Fig. 10 illustrates the position of parts when the crank disk has passed through one-quarter of its revolution, and Fig. 11 shows the final position of the parts with the lower member of the bar section completely folded, and the crank disk having passed through one-half of its revolution. At this point the clutch releases crank disk 45 from shaft 50.

When the parts reach the position shown in Fig. 11 of the drawings, the combined clamp and former 33 is withdrawn from engagement with the joint bar to permit the removal thereof, after which, by suitable means provided therefor, the folding-leaf 36 is returned to starting position, thus resetting the parts to repeat the cycle of operations above explained.

Figure 12:
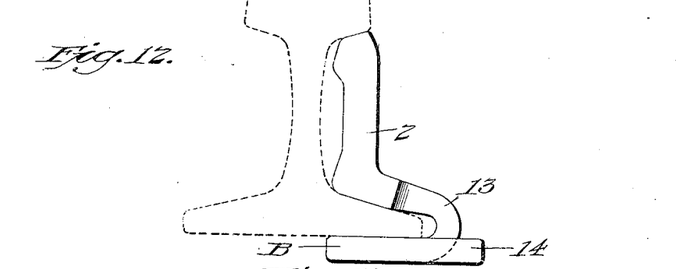
Figs. 12, 13, and 14 are sectional, plan, and perspective views, respectively, of the completed joint bar.
Figure 13:
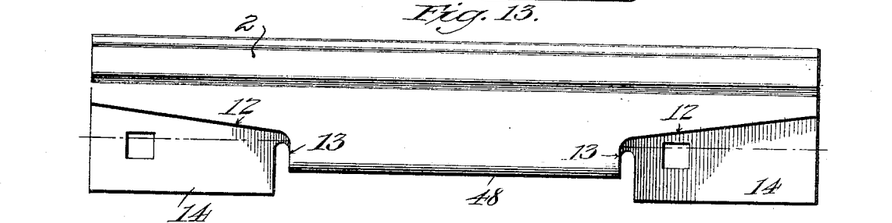
Figure 14:
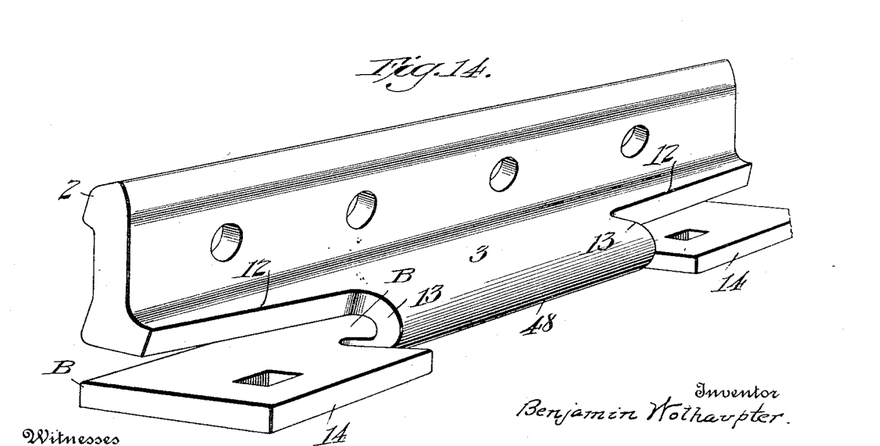
Figure 16:
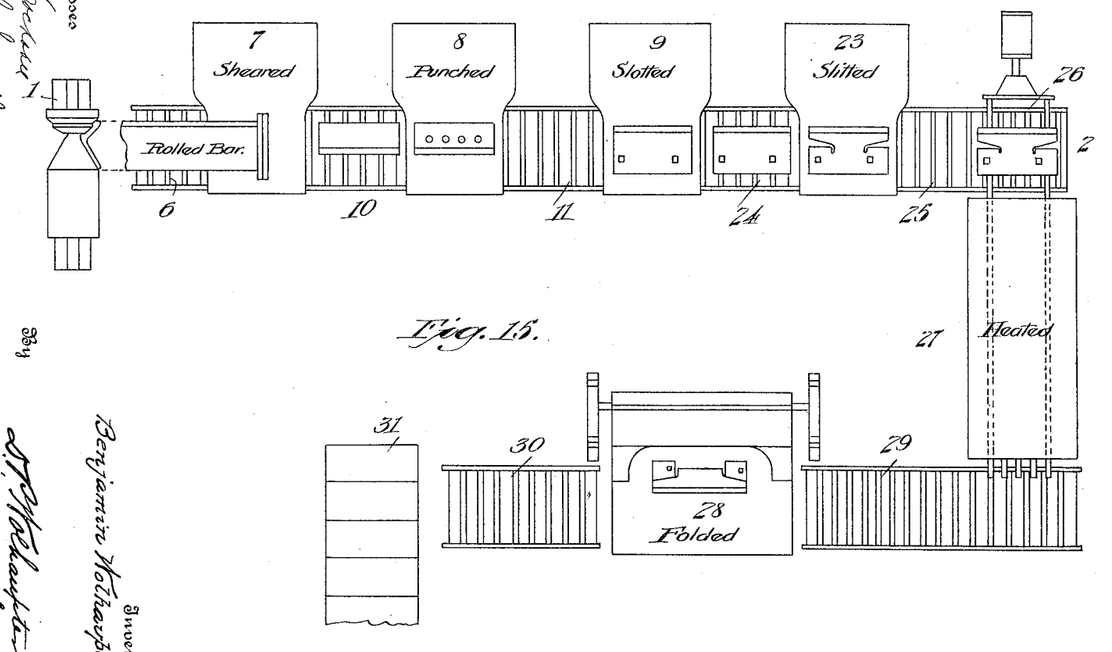

The finished rail joint bar as it is delivered from the folding machine or folding mechanism possesses the structural characteristic shown in Figs. 12, 13, and 14 of the drawings. As shown therein, the bar not only includes the main upright splice member 2 which fits the fishing space of the rail, but is also provided with a horizontal inwardly extending rail-supporting base section B extending continuously throughout the length of the joint bar, and horizontal outwardly extending spiking flanges 14 adapted to have a flat bearing on the ties and to receive the spikes. The spiking flanges 14 are turned out from the slitted end portions of the bar, and the intermediate portion of the base section B is connected with the main splice member of the bar by a connecting fold 48 occupying the central portion of the bar and contributing to its strength and reinforcement at the center of the joint.

While the process has been described particularly with reference to the production or shaping of a bar of the design shown in Fig. 14 of the drawings, wherein the spiking flanges 14 occur at the ends of the joint bar, it will be readily understood that the spiking flange 14 could be located in a position to admit the tie to come under the center of the joint, and without altering or affecting the steps of the process as herein described, it being obvious that the location of the slits in the lower member 3 would determine the location or position of the spiking flange or flanges.

Also, while the various steps of the process have been described in a certain order, it will now be apparent that various optional arrangements may be observed without departing from the spirit or sacrificing any of the advantages of the invention, as for instance it is not essential to this process that the bars be punched for the bolt holes and slotted for the spike holes at the particular places or locations suggested in the diagram in Fig. 15 of the drawings, nor need the order in which they are respectively punched and slotted be preserved as either of these operations could follow the other, and in fact both could be postponed until after the bar is folded with all of the parts in final position. Furthermore, while the reheating step, by means of the furnace 27 is a desirable one, yet it is to be understood that with high grade material and especially in the manufacture of small joints, the bending or folding step could be carried out with the material cold; and, also as to the bending or folding step of the process, the same need not necessarily be in one operation or in one movement as suggested herein, but may be accomplished in several stages, for instance by two or more operations, with suitable dies, in an ordinary bull-dozer or equivalent machine, without departing from the invention. In fact, any modifications or alterations within the scope of the appended claims can be made in the process, or in the instrumentalities utilized therein so long as the vital features are preserved of, first, rolling the billet or bar blank to simple angle bar formation with a wide flange member occupying substantially the same plane throughout; second, shearing the angle bar to rail joint lengths, third, slitting the angle bar section to define and form a spiking flange element or elements, and fourth, folding the flange member of the angle bar section to bring the base section to a rail-seating position and to turn the spiking flange outward to tie-bearing and spiking positions.

I claim:

1. The process of making rail joint bars which consists in first rolling a blank to form an angle bar section having an extended lower foot member occupying substantially the same plane throughout, then slitting an end portion of the foot member to define a separate flange element, and subsequently folding the outer edge portion of the foot member downwardly and inwardly and thereby simultaneously moving the flange element outwardly.

2. The process of making rail joint bars which consists in first rolling a blank to form an angle bar section having a relatively widened inclined foot member, then slitting an end portion of the foot member to define a separate flange element, and subsequently folding the outer portion of the foot member to a final position beneath and spaced from the non-folded portion of said member and simultaneously moving the said flange element to a final position projecting beyond one side of the bar.

3. The process of making rail joint bars which consists in first rolling a blank to form an angle bar section having an inclined foot member, then slitting an end portion of the foot member to define a separate flange element, and subsequently subjecting the foot member to a bending operation on a line of fold longitudinally thereof to move a portion of the foot member to a final rail-seating position beneath and spaced from the non-folded portion of said member and to move the flange element outwardly to a final position in substantially the horizontal plane of the rail seat.

4. The process of making rail joint bars which consists in first rolling a blank to form an angle bar section having a widely extended inclined foot member, then slitting said foot member, and subsequently folding a portion of the foot member into a final rail seating position beneath the non-folded portion thereof and to also thereby displace the metal at one side of the slit into its final tie-bearing position.

5. The process of making rail joint bars which consists in first rolling a blank to form an angle bar section having a widely extended foot member disposed in a position at an angle of more than one hundred fifty degrees from its required final position, then slitting said foot member, and subsequently folding a longitudinal portion of the foot member into a final rail seating position beneath the non-folded portion thereof.

6. The process of making rail joint bars which consists in first rolling a blank to form an angle bar section having a widely extended inclined foot member, then slitting both end portions of said member, and subsequently folding a portion of said foot member throughout its entire length into a rail seating position beneath the non-folded portion thereof.

7. The process of making rail joint bars which consists in subjecting a bar blank to a roll pass to form a simple angle bar section having a non-folded lower member, then cutting the bar to rail joint lengths, then slitting said lower member, and subsequently folding the outer portion of said lower member to bring it to final position beneath the non-folded portion thereof and to also thereby displace the metal at one side of the slit.

8. The process of making rail joint bars which consists in subjecting a bar blank to a roll pass to form a simple angle bar section having a non-folded lower member, then slitting said lower member, then reheating the bar, and subsequently folding the outer portion of said lower member to bring it to final position beneath and spaced from the non-folded portion of said member.

9. The process of making rail joint bars which consists in subjecting a bar blank to a roll pass to form a simple angle bar section having a non-folded lower member, then shearing the bar to rail joint lengths, next slitting said lower member, then reheating the bar, and subsequently folding the outer portion of said lower member to bring it to final position beneath and spaced from said lower member.

10. The process of making rail joint bars which consists in subjecting a bar blank to a roll pass to form a simple angle bar section having a non-folded lower member, then shearing the bar to rail joint lengths, next slitting inwardly the end portions of said lower member, and subsequently folding the outer portion of said lower member to bring it to final position beneath and spaced from said lower member, and to also thereby displace the metal at on side of said slits to a final position at the outer side of the bar.

11. The process of making rail joint bars which consists in subjecting a bar blank to a roll pass to form a simple angle bar section having a non-folded lower member, slitting the end portions of said member to define terminal flange elements, and subsequently folding the outer portion of said lower member throughout its entire length to bring the same to final rail-seating position beneath and spaced from said lower member, and to also thereby displace and carry said terminal flange elements outwardly to final tie-bearing position.

12. The process of making rail joint bars which consists in subjecting a bar blank to a roll pass to form a simple angle bar section having an extended lower member, then slitting the end portions of said member by punching pieces of metal out of the same, and subsequently folding the outer portion of said lower member throughout its entire length to move the same to a final position beneath and spaced from the non-folded portion of said member.

13. The process of making rail joint bars which consists in subjecting a bar blank to a roll pass to produce an angle bar splice section having a lower member occupying substantially the same plane throughout, then punching out portions of said member to define a separate flange element, and subsequently folding the outer portion of said lower member downwardly and inwardly to bring it and said flange element to final position.

14. The process of making rail joint bars which consists in subjecting a bar blank to a roll pass to form a simple angle bar section having a non-folded lower member, then punching out portions of said lower member to produce slits therein, then reheating the bar, and subsequently folding the outer portion of said lower member to bring it to final position beneath and spaced from the non-folded portion of said member.

15. The process of making rail joint bars which consists in subjecting a bar blank to a roll pass to form a simple angle bar section having a non-folded lower member, then shearing the bar to rail joint lengths, then punching out end portions of said lower member to produce slits therein, then reheating the bar, and subsequently folding the outer portion of said lower member to bring it into final position beneath and spaced from the non-folded portion of said member.

16. The process of making rail joint bars which consists in subjecting a bar blank to a roll pass to form a simple angle bar section having an extended lower foot member adapted to be punched for track spikes and whose upper member is adapted to be punched for track bolts, shearing the bar to rail joint lengths, slitting said lower foot member, and subsequently folding the outer portion of said lower foot member to bring it into final position.

17. The process of making rail joint bars which consists in subjecting a bar blank to a roll pass to form a simple angle bar section having an extended lower foot member, shearing the bar to rail joint lengths, punching the upper member for track bolts, slitting said lower foot member, reheating the bar, and folding the outer portion of said lower foot member to bring it into final position.

18. The process of making rail joint bars which consists in subjecting a bar blank to a roll pass to form a simple angle bar section having an extended lower foot member, shearing the bar to rail joint lengths, punching the upper member for track bolts, punching portions of the lower foot member for track spikes, slitting said lower foot member, reheating the bars, and folding the outer portion of said lower foot member to bring it into final position.

19. The process of making rail joint bars which consists in subjecting a bar blank to a roll pass to form a section having a rail-fishing member and a lower foot member extended at a different angle from the fishing surface of the fishing member, then slitting the end portions of said lower member, and subsequently folding the outer portion of said lower member throughout its entire length into its final position.

20. The process of making rail joint bars which consists in subjecting a bar blank to a roll pass to form a section with a rail-fishing member having a lower fishing surface in its final plane, and with a lower foot member having a rail-clearance surface in its final plane disposed contiguous to but at a different angle from that of said fishing surface, then slitting the end portions of said lower member, and subsequently folding into its final position that portion of the lower member lying beyond the said rail-clearance surface thereof.

21. The process of making rail joint bars which consists in subjecting a bar blank to a roll pass to form a section with a rail-fishing member having a lower fishing surface in its final plane, and with a lower foot member having a rail-clearance surface in its final plane disposed contiguous to but at a different angle from that of said fishing surface, then slitting inwardly the end portions of said lower member, and subsequently folding the outer portion of the lower member throughout its entire length into its final position.

In testimony whereof I hereunto affix my signature in the presence of two witnesses.

BENJAMIN WOLHAUPTER.

Witnesses:
   E. F. SCHERMERHORN,
   K. McNALLY.

Copies of this patent may be obtained for five cents each, by addressing the "Commissioner of Patents Washington, D. C."